(12) United States Patent
Nakamoto et al.

(10) Patent No.: US 6,167,663 B1
(45) Date of Patent: Jan. 2, 2001

(54) ADJUSTABLE FRAME

(75) Inventors: Yusho Nakamoto, Hatsukaichi; Katsunori Sako, Hiroshima; Kiminori Kubo, Hatsukaichi, all of (JP)

(73) Assignee: Kabushiki Kaisha Juken Sangyo, Hiroshima (JP)

( * ) Notice: Under 35 U.S.C. 154(b), the term of this patent shall be extended for 0 days.

(21) Appl. No.: 09/139,669

(22) Filed: Aug. 25, 1998

(51) Int. Cl.$^7$ .................................................. E06B 1/60
(52) U.S. Cl. .................... 52/217; 52/204.56; 411/366.1; 411/368
(58) Field of Search .................... 52/217, 364, 204.56; 49/404, 411, 505; 411/546, 338, 364, 366.1, 368

(56) References Cited

U.S. PATENT DOCUMENTS

| | | | |
|---|---|---|---|
| 1,724,186 | * 8/1929 | Fox | 49/404 |
| 2,595,506 | * 5/1952 | Backman | 52/217 X |
| 4,453,346 | * 6/1984 | Powell et al. | 52/217 X |
| 4,662,807 | * 5/1987 | Lien et al. | 52/364 |

FOREIGN PATENT DOCUMENTS

| | | | |
|---|---|---|---|
| 887 385 | 6/1981 | (BE) . | |
| 2 253 757 | 5/1974 | (DE) . | |
| 0 207 476 A1 | 1/1987 | (EP) . | |
| 2 127 225 | 10/1972 | (FR) . | |
| 2 215 849 | 8/1974 | (FR) . | |
| 2 293 425 | 3/1996 | (GB) . | |
| 86 872 | 11/1987 | (LU) . | |
| 6802514 | * 8/1969 | (NL) | 52/217 |
| 7 902 064 | 9/1980 | (NL) . | |
| WO 98/01647 | 1/1998 | (WO) . | |

* cited by examiner

*Primary Examiner*—Richard Chilcot
(74) *Attorney, Agent, or Firm*—Oliff & Berridge, PLC (57) ABSTRACT

The present invention is directed to a frame that is placed at an opening portion in a partition provided in houses and the like, and specifically an adjustable frame comprising a plurality of frame adjustable fasteners including: a fixing member including an external thread member having a cylindrical manner for being incorporated at a partition side of an opening portion in a partition provided in houses and the like, and a base member for rotatably supporting said external thread member; and an internal thread member for being rotatably engaged with said external thread member and for installed in a frame body. The adjustable frame allows the external thread member to be turned, thereby adjusting its length, capable of fixing to the opening portion of the partition. Further, if necessary, the adjustable frame may be comprised of a pair of frame members having the width where a first frame member and a second frame member overlap in part in a thickness direction of the partition (wall thickness). It is provided a surface member so arranged that the end face of said second frame member that overlaps the surface of said first frame member and the edge surface thereof are covered, and a clip engaging member for allowing said first frame member to be brought into contact with the back surface of said second frame member is also provided. In the above-mentioned arrangement, therefore, the adjustable frame can be adapted for the wall thickness of the opening portion. The adjustable frame can be realized in a manner that the spacing between the partition and the frame can be readily adjusted by turning the external thread member at the time of installation of the frame at the opening portion of the partition provided in houses and the like, and can be adapted for different levels of the wall thickness by a separated frame member in a wall thickness direction of the opening portion.

5 Claims, 6 Drawing Sheets

ADJUSTABLE FRAME

BACKGROUND OF THE INVENTION

1. Field of the Invention

The present invention relates to a frame that is placed at an opening portion in a partition provided in houses and the like, and particularly relates to an adjustable frame material capable of adjusting the spacing between a frame and a building frame and further adjusting a width of the frame.

2. Description of the Related Art

Figure 7:
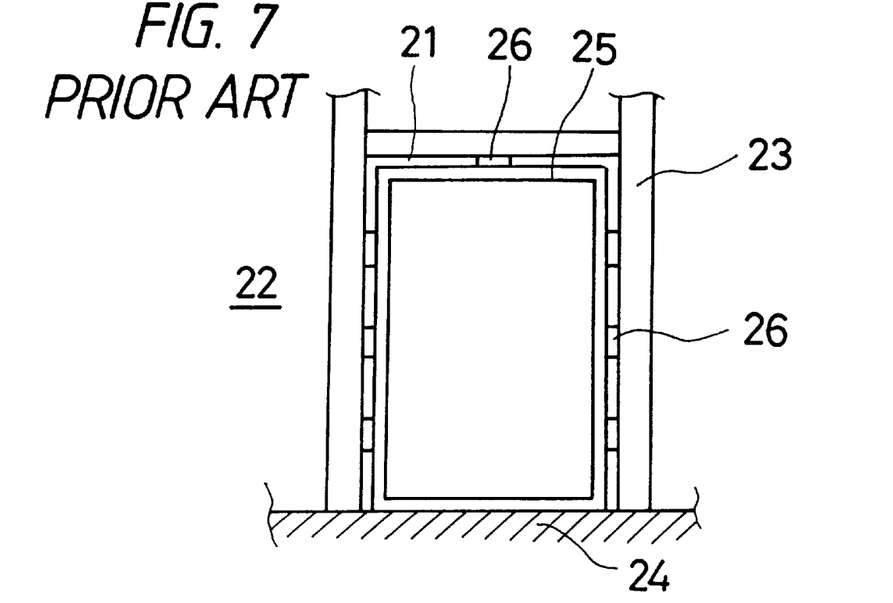
FIG. 7 is a front view illustrating the condition of a conventional frame adjusting construction work.

In constructing houses and the like, when a door or a window is desirably disposed in a partition of an outside wall or an divider wall, a frame is initially located at an opening portion provided in the partition. The frame should be placed with great accuracy for installation so that a door or a window which is later installed within the frame can be smoothly opened and closed. In order to do so, the frame adjustment is carried out. FIG. 7 illustrates the state of a conventional adjusting construction work for installing a frame. In FIG. 7, reference numeral 21 shows an opening portion formed in a partition 22. The opening portion 21 is formed in a rectangular manner to extend vertically upwards from a floor 24 with a pillar of the partition 22 or a building frame 23 in an divider member. A frame 25 is located inside the opening portion 21, a spacing is formed between an outer periphery of the frame 25 and an inner periphery of the building frame 23, and packing members 26 are close-fitted into plural portions of the spacing. Accordingly, the frame 25 can be fixedly bonded to the building frame 23.

The fixedly bonded frame 25 may be adjusted with accuracy for installation by the packing members 26. For the packing members 26 are used thinned wooden pieces such as construction remaining, veneer plate pieces or wedge-shaped wooden pieces. One or more pieces of the packing members 26 is, portion by portion, inserted to and removed from plural portions of the spacing between the frame 25 and the building frame 23 that extends right and left vertical upwards and is formed at the upper lateral side therebetween. This work is repeated manually to realize a fine adjustment such as some millimeter adjustment. When accuracy for installing the frame 25 is realized, the packing members 26 are affixed by adhesive or screwed to finish the adjustment. As a result, the frame 25 has been fixedly bonded to the building frame 23.

A method of executing a conventional frame adjustment having the foregoing arrangement has disadvantages as below. That is, in order to obtain great accuracy for installation, such a fine adjustment as inserting the packing members into and removing the packing members from plural portions of the spacing requires a skill as well as a long time-consuming manual work. Also, once the adjustment is finished, the thus bonded packing members cannot be readily removed. Accordingly, the readjustment cannot be made for inaccuracy for installation that occurs after the adjustment or for frame deformations.

SUMMARY OF THE INVENTION

In view of the foregoing disadvantages inherent in the prior art, an object of the present invention is therefore to provide a frame that is placed at an opening portion in a partition provided in houses and the like, and specifically an adjustable frame material capable of readjustment with a simple and short-time work but no requirement of a skill.

Another object of the present invention is directed to a width adjustable frame material for making it possible to adjust the width of the frame material so as to be adaptable for the wall thickness (thickness of the building frame) of the opening portion that the frame is to be installed.

Conventionally, as a frame material used for houses and the like should be adapted for walls having different levels of the wall thickness at different building site, so-called ready-made or existing frames are in common used that have certain predetermined widths corresponding to various levels of the wall thickness.

Figure 12:
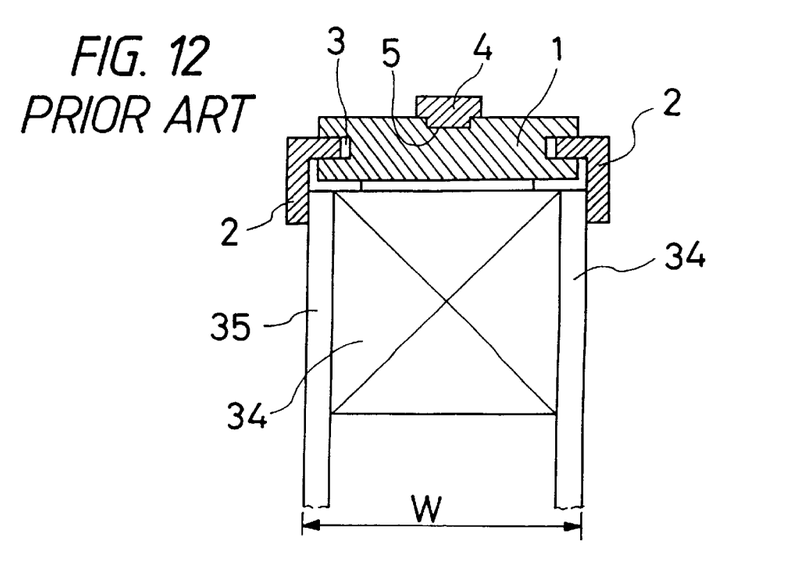
FIG. 12 is a cross-sectional view of a conventional adjustable frame (in a hinged door).

Also, recently, as indicated in FIG. 12, a frame material that is called an adjustable frame was invented and has been widely employed for adjustment in which a frame material body 1 is provided with an adjusting groove 3 at an either side or the both sides thereof. The end portions of casing members 2 are taken in and out at the groove 3 corresponding to the wall thickness W, so that the width of the frame can be adjusted. Accordingly, a single type of the frame material may be adaptable for a certain range of the wall thickness W. When these frame materials are used for a door, the frame materials with a door stopper 4 attached thereto may be employed. In FIG. 12, reference numeral 34 denotes a pillar (or a building frame) and reference numeral 35 wall members.

However, the conventional frame materials as described above include the following disadvantages.

(1) Various types of frame materials are required:

Since only one ready-made frame having a certain width must be used for a corresponding level of the wall thickness, various types of frame materials matching with each of the different levels of the wall thickness are required.

(2) Removing is not possible:

Both the ready-made frame and the adjustable frame are firmly secured to a pillar or the like by using nails or an adhesive, it would not facilitate removing an unnecessary door frame during modification construction, etc. If such a door frame is forcibly removed, the door frame is subjected to breakage, incapable of being reused.

(3) A protruding door stopper is nuisance:

In both cases of the ready-made frame or the adjustable frame, since the door stopper 4 that impacts on a door when the door is closed is commonly affixed inside the door frame in an independent manner, the door stopper 4 is caused to project from the door frame, the protruding door stopper being made nuisance in the design. The door stopper 4 may also be broken because the stopper prevents one product to be delivered from passing through the frame.

(4) The large number of members to be installed at construction places are necessary and accuracy for installation is required:

The adjustable frame having an adjusting portion at the both sides thereof is so arranged that the casing members 2 are taken in and out at the adjusting groove 3, and various types of the casing members 2 are prepared. Therefore, the adjustable frame may be adapted for considerble levels of the wall thickness W. However, there are at least four members, that is, a frame material body 1, two casing members 2 and a door stopper 4, necessary for installation. In addition, the frame material body 1 must be properly mounted at the center portion of the wall thickness W. If any delocation therefrom occurs, the range capable of being adapted for the wall thickness W would be brought narrower, and further in view of the appearance, either one of the ends of the casing members 2 is protruded from the either side of the frame material body, resulting in inconvenience for the construction work.

(5) Possible defects occur:

The ready-made frame is firmly secured by utilizing both nails and adhesive at the time of fixing. The position of hammering nails in the adjustable frame is adjusted by taking the casing members 2 in and out at the casing members 2 from the adjusting groove 3. Then, such ways are adopted in common that the nails are hammered into an installed groove 5 for the door stopper 4 in the frame material body 1, or nails are hammered in angular directions with respect to the adjusting grooves 3, or otherwise from the back surface in an angular manner. On the other hand, in the ready-made frame, such ways are generally used that the nails are hammered from the back surface in an angular manner or otherwise finishing nails are driven from a hidden portion on a decorative surface. For any of the aforementioned ways, however, since a hammer or an automatic nailer is used for hammering nails, there is a fear that the decorative surface is subjected to defects.

(6) Possible delocation occurs at constructing time

As for both the ready-made frame and the adjustable frame, although the nails are hammered while the frames are held by hands, there is a tear of delocation because no preliminary fixing may be applied to these frames. Once any delocation occurs, the frames would be hardly corrected to return to the original respective forms.

In order to overcome the disadvantages as shown in the above (1) to (6), the second object of the present invention is, as previously described, to provide a width adjustable frame material for making it possible to adjust the width of the frame material so as to be adaptable for the wall thickness.

According to one aspect of the present invention, there is provided an adjustable frame body capable of adjustably fixing so as to be adapted for the spacing between the building frame and the frame is characterized by comprising: a fixing member including an external thread member having a cylindrical manner for being incorporated at a partition side of the opening portion in the partition provided in houses and the like, and a base member for rotatably supporting the external thread member; and a frame body for installing therein an internal thread member that is to be rotatably engaged with the external thread member.

According to the present invention, a plurality of frame adjustable fasteners comprising the fixing member and the internal thread member, wherein a plurality of the frame adjustable fastener are mounted at the periphery of the frame.

BRIEF DESCRIPTION OF THE DRAWINGS

In the accompanying drawings.

DESCRIPTION OF THE PREFERRED EMBODIMENTS

Hereinbelow, a detailed description of the preferred embodiments will be made in accordance with the present invention, referring to accompanying drawings.

Figure 1:
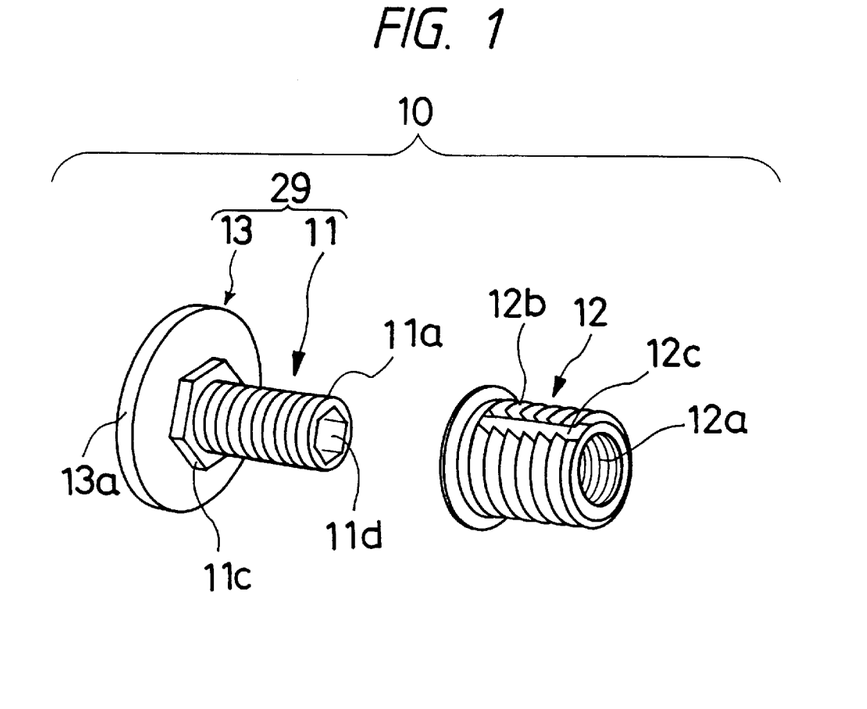
FIG. 1 is an exploded perspective view of a frame adjustable fastener according to the present invention.
Figure 2:
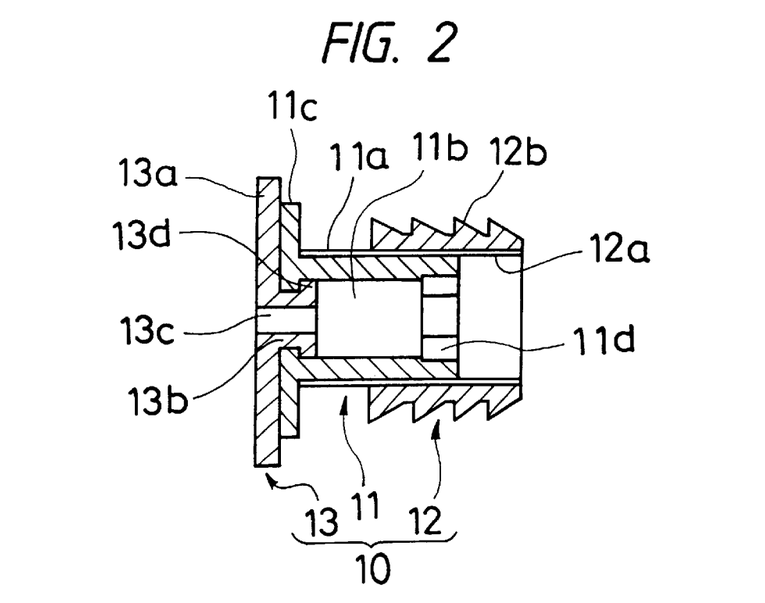
FIG. 2 is an assembling cross-sectional view of the frame adjustable fastener according to the present invention.
Figure 3:
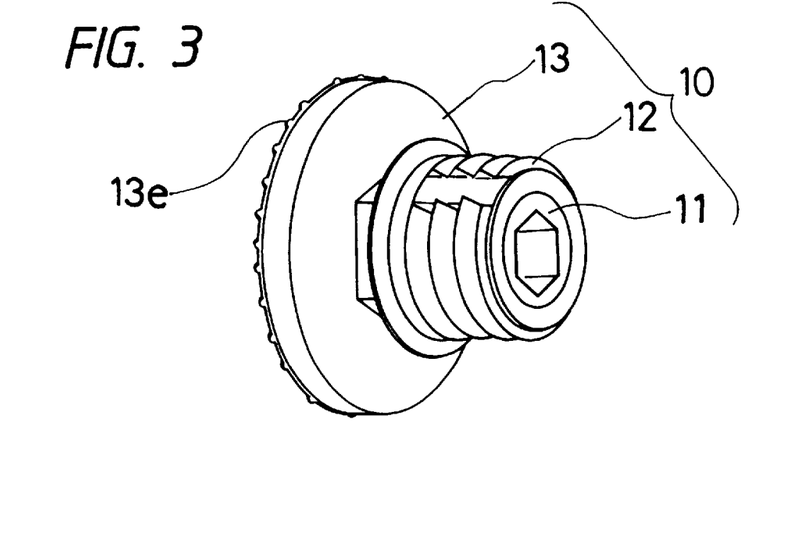
FIG. 3 is a perspective view of the frame adjustable fastener according to the present invention.
Figure 4A:
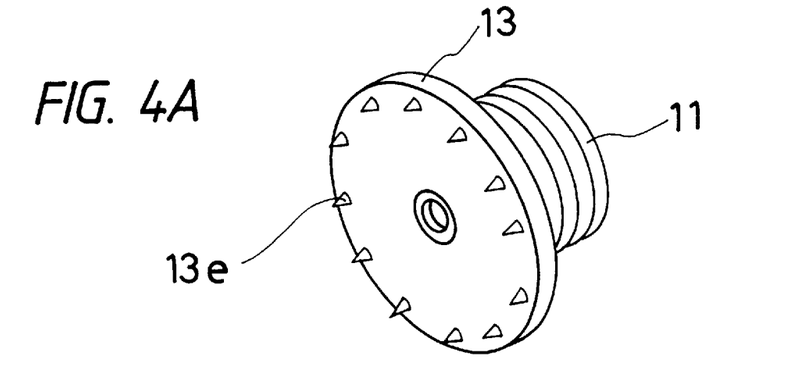
FIGS. 4A and 4B are perspective views of exemplified projections for stopping sliding located on the back surface of a receiving member.
Figure 4B:
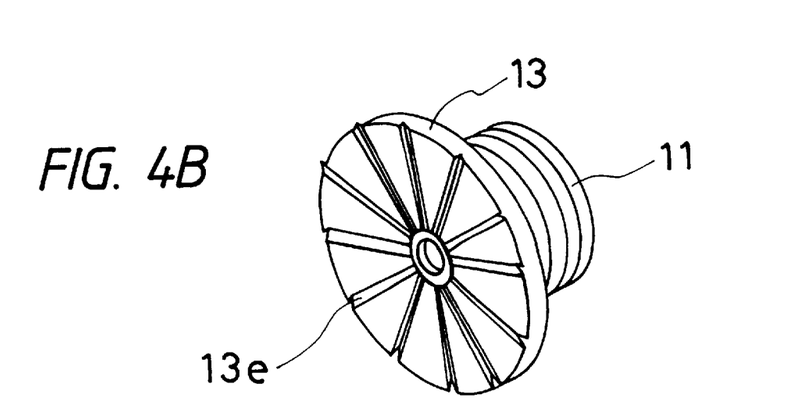

FIG. 1 is an exploded perspective view of an example of a frame adjustable fastener to be installed in a frame body, of the present invention. FIG. 2 is a cross-sectional view showing the state where a fixing member and an internal thread member are combined with each other. In FIG. 1, reference numeral 10 shows a frame adjustable fastener, and the frame adjustable fastener 10 is comprised of a fixing member 29 including an external thread member 11 and a base member 13, and an internal thread member 12. The external thread member 11 is of substantially a bolt shape in a cylindrical manner, wherein an external thread 11a is formed around substantially entirely the outer periphery of the member 11 in a form of a round stick, a through hole 11b extending axially in the center of the member 11, a rotation-supporting position 11c in a hexagonal manner like a hexagonally headed bolt being provided at one end of the member 11, and a hexagonal socket portion 11d is provided in the through hole 11b at the other end thereof. The internal thread member 12 has a generally thick cylindrical configuration, wherein an internal thread 12a capable of rotatably engaging with the external thread member 11 is formed in the inner hole of the cylindrical configuration and a falling-preventing portion 12b in a ring form is formed at the outer periphery thereof. The base member 13 is formed in a disc manner, wherein a disc projection 13b is formed at the upper central portion of a plate portion 13a, the disc projection 13b which is rotatably inserted into the through hole 11b of the external thread member 11, a ring projection 13d that is engaged in the through hole 11b is formed at the top end-outer periphery face of the disc projection 13b, and a screw hole 13c is formed in the disc projection 13b for passing through the plate portion 13a and the disc projection 13b. Also, projections 13e are provided on the back face of the plate portion 13a along the peripheral face of the plate portion 13a so as to stop sliding. It is noted that the hexagonal socket portion 11d of the external thread member 11 is not limited to a hexagonal one, or may be of square or other polygon so as to mate with the cross-sectional configuration of the used wrench. Also, the external thread member 11 may be of any length so as to correspond to the opening portion of the partition. FIG. 3 is a perspective view showing the frame adjustable fastener 10 in the state where the internal thread member 12 is rotatably engaged with the external thread member 11. FIG. 4 illustrates other modified examples of the projections 13e for slide-stopping into a building frame surface, the projections 13e being attached onto the back surface of the base member 13. FIG. 4A illustrates a modification of the projections 13e for being formed in a triangular pyramid manner. FIG. 4B illustrates another modification of the projections 13e in a triangular cross sectional manner that are arranged radially.

According to the present invention, the adjustable frame body is provided with the frame adjustable fastener 10 having the abovementioned arrangement, wherein the internal thread member 12 is press-fitted and installed in a hole 25*b* for the internal thread member 12 that is formed in the frame body 25, and then the external thread member 11 is rotatably engaged with the internal thread member 12. The adjustable frame body thus installing the fixing member 29 is commercially available.

The internal thread member 12 that has been incorporated in the frame body 25 is secured to the frame body 25 by the falling-preventing portion 12*b* provided at the outer periphery so that the internal thread member 12 may not be easily removed. The hole 25*b* for the internal thread member 12 that is formed on the frame body 25 is comprised of a hole for press-fitting the internal thread member 12, and a through hole 25*a* having a smaller diameter than this hole for allowing the external thread member 11 that is rotatably engaged with the internal thread member 12 to be turned from the surface side of the frame body 25 (the decorative surface 25*c* side of the frame body). The frame adjustable fastener 10 is typically made of metal materials. Preferably, the internal thread member 12 is of hard plastic such as a nylon so as to facilitate hammering into the frame body 25 and being removed in an urgent case. Reference numeral 12*c* shows a groove that is formed in the falling-preventing portion 12*b*.

Figure 5:
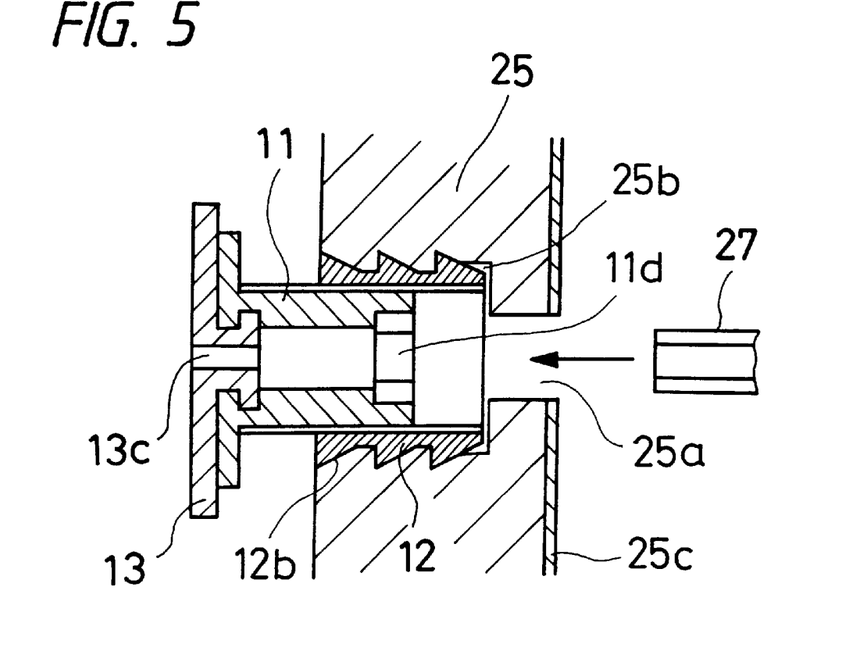
FIG. 5 is a cross-sectional view showing a portion where a frame adjustable fastener for a adjustable frame body is located according to the present invention.
Figure 6:
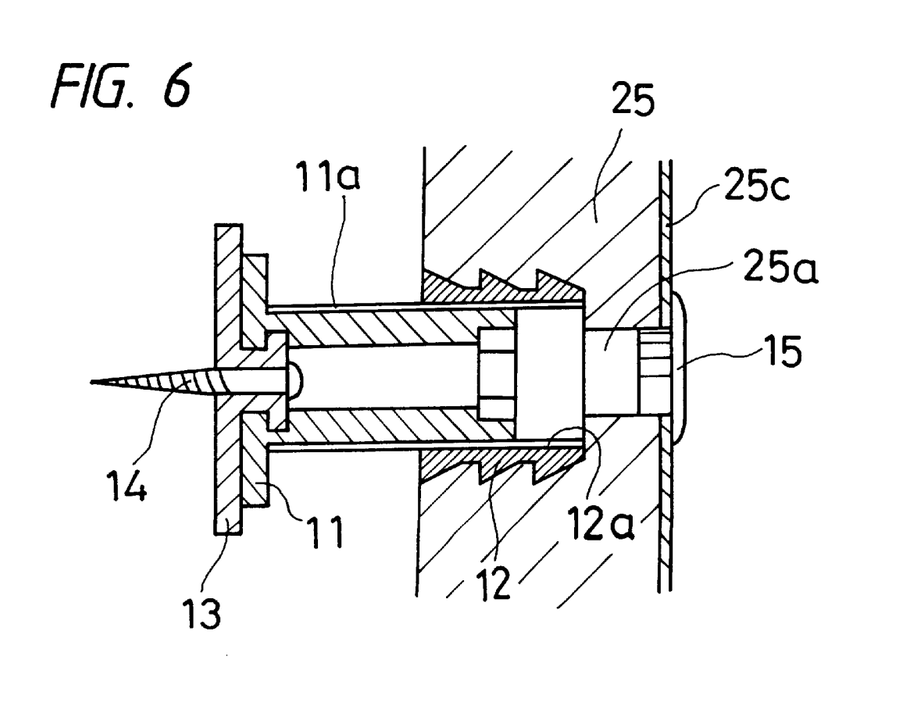
FIG. 6 is a cross-sectional view illustrating the condition of the construction work for the adjustable frame body according to the present invention.

FIGS. 5 and 6 are both cross-sectional views illustrating how the adjustable frame body of the present invention may be executed for adjustment. In FIG. 5, the adjustable frame body 25 incorporating the frame adjustable fastener 10 is installed at a predetermined position inside the opening portion 21 formed in the partition 22. The adjustable frame body 25 is provided with a through hole 25*a* for turning the external thread member 11, and a wrench 27 is introduced into the through hole 25*a* to turn the external thread screw member 11. Thereby, the fixing member 29 is caused to move to the opening portion 21 side or the pillar or the building frame 23 of a partition, and then the back surface of the base member 13 is brought into contact with the surface of the building frame 23. Then, a screw 14 is inserted into the through hole 25*a*, leading to the through hole 11*b* of the external thread member 11, and tighten by a screwdriver or the like within the screw hole 13*c* of the base member 13 to secure the base member 13 to the building frame 23. At this time, the projections 13*e* affixed to the back surface of the base member 13 prevent the base member 13 from turning, and thus the screw 14 is positively secured. This operation is carried out for each of the frame adjustable fasteners 10 to preliminary fix the frame body 25 thereto. Then, the wrench 27 is introduced into a through hole 25*a* for turning the external thread member 11 to fine-adjust the position of the frame body 25, resulting in completion of the frame body 25 installation. A cap 15 is capped into the through hole 25 for turning an external thread member, for the decoration. Thus, the frame adjustment is finished. FIG. 6 is a cross-sectional view showing the thus fixed frame body 25.

When the frame adjustment is performed under the construction after the frame adjustment completes or in use after the completion, and the cap 15 is released and a wrench such as a hexagonal wrench is introduced into the through hole 25*a* of the frame body 25. The hexagonal wrench is fitted into the hexagon hole portion 11*d* of the external thread member 11, turning the external thread member 11, to complete the frame adjustment. When the frame body 25 is removed for reconstruction work or the like, a screwdriver is introduced into the through hole 25*a*, releasing the screw 14. Thereafter, the external thread member 11 is sufficiently engagedly inserted into the internal thread member 12 in the same manner as above. As a result, the base member 13 is transferred to the frame body 25 concurrently with the external thread member 11. Accordingly, the bonding relation between the building frame 23 and the frame body 25 is caused to be released to thereby enable the frame body 25 to be readily removed.

According to the present invention, the adjustable frame body has such an arrangement and may realize operative effects as described below.

According to the present invention, in a frame that is placed at an opening portion in a partition provided in houses and the like, wherein the adjustment is carried out by allowing screws to be engagedly fitted into plural portions of the spacing between the building frame of the partition and the frame. The adjustment work is to be made only by screw-adjustment of a spanner or a wrench and therefore, a short-time simple work without a skill can be realized. Also, such a screw adjustment can be made in any time, facilitating readjustments. Furthermore, the fine screw-adjustment may be performed, so that great accuracy for installation can also be facilitated.

The projections affixed to the back surface of the base member 13 makes it possible to readily fix the base member while a screw adjusting portion on the partition does not need a recess portion and the like. The positioning of the frame is facilitated and great accuracy for positioning is realized without fail.

The frame adjustable fastener comprises an external thread member having a rotation-supporting portion formed, a base member for receiving the external thread member, which are to be attached to the building frame of the partition, and an internal thread member to be secured to the frame body. With this arrangement, these simple structural members can attain the frame adjustable fastener that facilitates a simplified adjustment and a dependable positive fixing.

The adjustable frame body of the present invention is delivered to the building site in the state where the frame adjustable fasteners have been installed. A screwdriver and a wrench are used for easy execution. Since the frame adjustable fasteners are integrally delivered with the frame, there is no deficient nor unsuitable component and therefore a smooth construction work can be realized.

In accordance with the present invention, there is provided an adjustable frame body, in which the frame can be arranged and then be fixedly bonded to the partition without any breakage or contamination on the finished partition. The frame fixedly bonded to the partition can also be removed by deassembling without any breakage, and the frame can also be reused.

According to second aspect of the present invention, there is provided a width adjustable frame material wherein the frame material is separated into two, and the width where the two separated frame members overlap is adjusted to be functioned as a width adjustable function and a function of concealing a spacing. The width adjustable frame materials have a simple configuration and can be readily installed.

Accordingly, the width adjustable material of the present invention comprises a pair of frame members capable of being separated widthwise into two, characterized in that the width where the two separated frame members overlap is adjusted to thereby be adaptable for the wall thickness of the wall to be fixed.

More specifically, the width adjustable frame material comprises a first frame member and a second frame member having a width where the first frame member and the second frame member overlap in part, characterized in that a surface member is mounted on the surface of the first frame member, the surface member being so arranged that the end face of the second frame member that overlaps the surface of the first frame member and the edge surface thereof are covered, and clip engaging members for allowing the first frame member to be brought into contact with the back surface of the second frame member is provided.

The pair of the frame members may be arranged as on frame member having an L-shaped contour and the other frame member having an inverse L-shaped contour with widthwise cross section, wherein an abutting surface for abutting the frame body against the wall surface of the wall where the frame material is attached is formed on the respective one edge back surface in an upstanding condition. By this way, when the frame material is attached to the end face of the wall, the width of the frame material can be adjusted with ease with reference to the wall thickness.

A surface member is formed on the surface of the first frame member, if necessary, for covering the end face of the second frame member that overlaps the surface of the first frame member, and the edge surface thereof. The surface member is generally formed in an L-shaped fashion with widthwise cross section having the same length as the frame members. The side edge portion of one side of the L-shaped surface member is fixedly engaged with an engaging groove that is formed in the surface of the first frame member, and the other side of the L-shaped surface member extends over the edge surface of the second frame member.

The surface member is not necessarily configured in an L-shaped manner with cross section to make a sheet upstanding at one side thereof, but in a manner that the end face and the edge surface of the second frame member can be covered. For this purpose, portions of the surface member may be formed of a resilient member such as rubber or soft polyvinyl chloride (PVC) to serve as a dualfunction as a door stopper member.

If the end face of the second frame member that overlaps the surface of the first frame member is a decorative face, and a door stopper member is attached to the end face, the surface member may not be required for provision.

The second frame member is provided clip engaging members at the back surface thereof, and the clip engaging members may hold the first frame member so as to allow the first frame member positioned on the back surface of the second frame member to abut against the back surface of the second frame member. Therefore, metallic clips such as clips with thinned steel plates subjected to bending may be placed at a certain spacing lengthwise of the frame members, and the engaging members may be formed of a plastic mold that is molded in a clip fashion having the same length to the frame members.

For the material of the frame members and the like may be a single or a combination of a solid wood, plywood, fiber plate, laminated veneer lumber (LVL), glued laminated wood or other wooden materials, plastic, metal, etc.

Therefore, if the wall surface having the frame materials installed is finished by applying wall papers, etc., the frame member body section may be formed of a wooden plate and the upstanding portions, including abutting faces against the wall surface, which are formed at the edge back surfaces of the frame members are made of metals or plastics.

Although description will now be made of several embodiments of the present invention with reference to the accompanying drawings, the present invention should not be limited to these embodiments.

Figure 8:
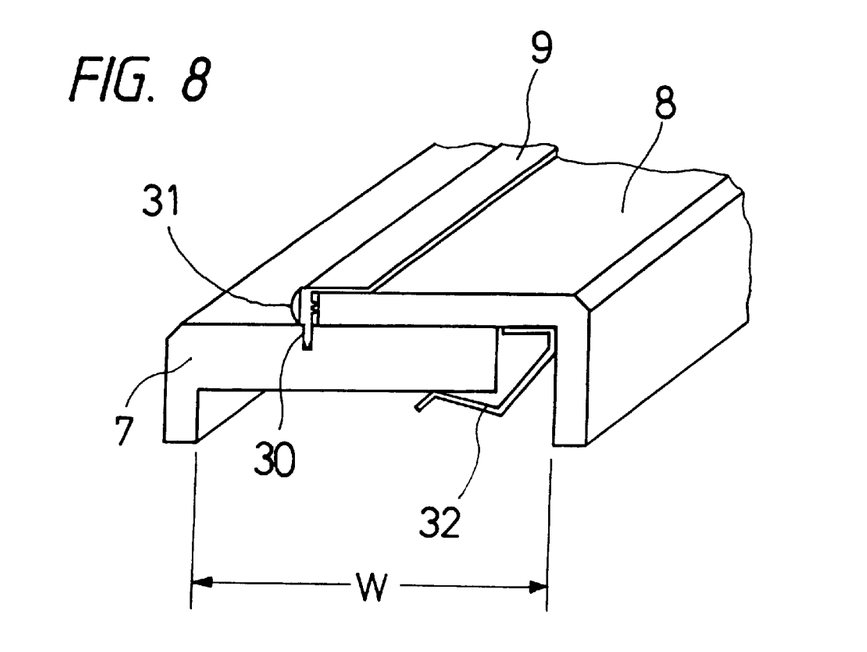
FIG. 8 is a perspective view of an example of frame materials according to the present invention.
Figure 9:
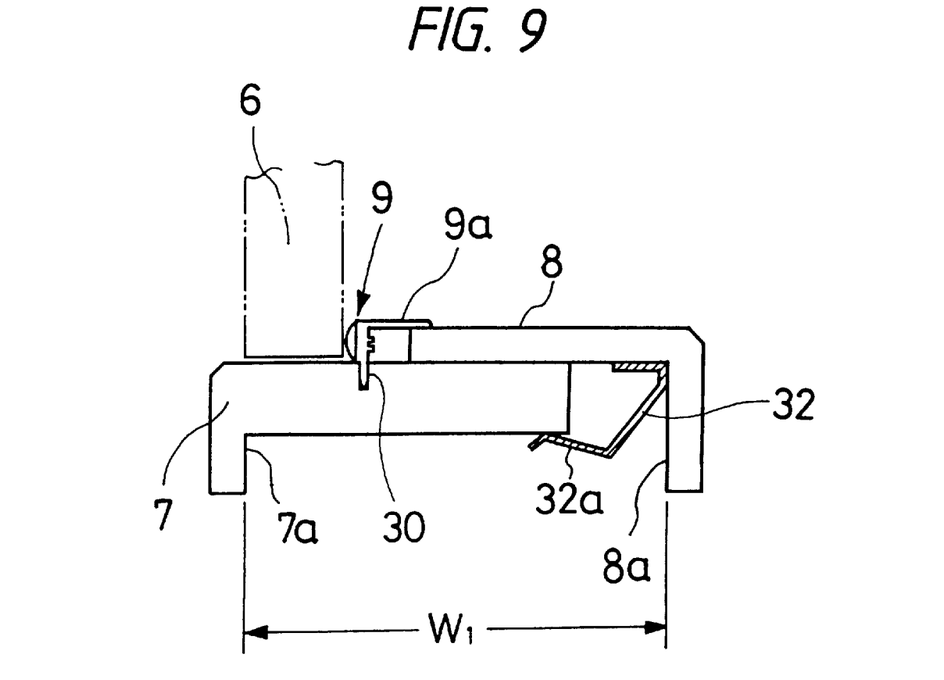
FIG. 9 is a cross-sectional view illustrating the condition where the frame materials shown in FIG. 1 is used.

FIGS. 8 and 9 show an example of the width adjustable frame material of the present invention having a basic structure. In the Figures, reference numeral 7 shows one frame member A and reference numeral 8 the other frame member B. Reference numeral 9 denotes a substantially L-shaped surface member with cross section which is attached to the surface of the frame member A, and the perpendicular leg portion of the surface member 9 is fixedly engaged with an engaging groove 30 that is formed in the surface of the frame member A. The other side (surface side) extends over the end surface of the other frame member B. Since the surface member 9 serves as a dual function as a door stopper, a packing portion 31 having a resilient projecting configuration is provided at a side surface of the surface member 9, whereby dually functioning as a cushion for impacting noise when a door 6 closes and as clearance-proof. Reference numeral 32 denotes a clip engaging member for holding the one frame member A (7).

The width adjustable frame material of the present invention is adaptable for the wall thickness W1 by sliding the other frame member B, as illustrated in FIG. 9, when the wall thickness W is larger than that shown in FIG. 8. As seen from the Figures, a surface side 9a of the surface member 9 is given a sufficient length to reach the surface of the frame member B (8) even if the frame member B is slid. As the frame member A (7) is held so as to be clamped, a clip side 32a of the clip engaging member 32 provided on the back face of the frame member B (8) is in the same manner.

The width adjustable frame material allows wall abutting faces 7a and 8a to abut against the wall surface upstanding on the back surface of each the frame member during construction, thereby facilitating its positioning.

Preferably, the engaging groove 30 for fixing the surface member 9 has been machined to groove at a manufacturing factory, and the surface member 9 is installed at a construction area.

In this way, since all the frame member, engaging groove, surface member and clip engaging member are predeterminedly manufactured or machined at a manufacturing factory, each of the members can be optionally selected and used by combining these depending upon the purpose.

Figure 10:
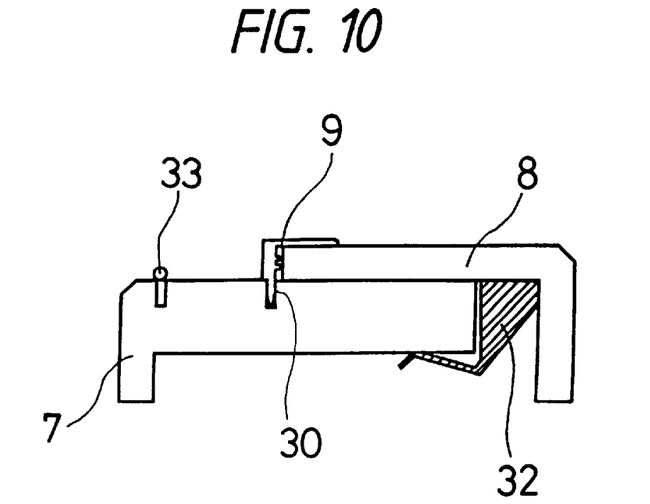
FIG. 10 is a cross-sectional view exemplifying another frame member (in a hinged door) according to the present invention.
Figure 11:
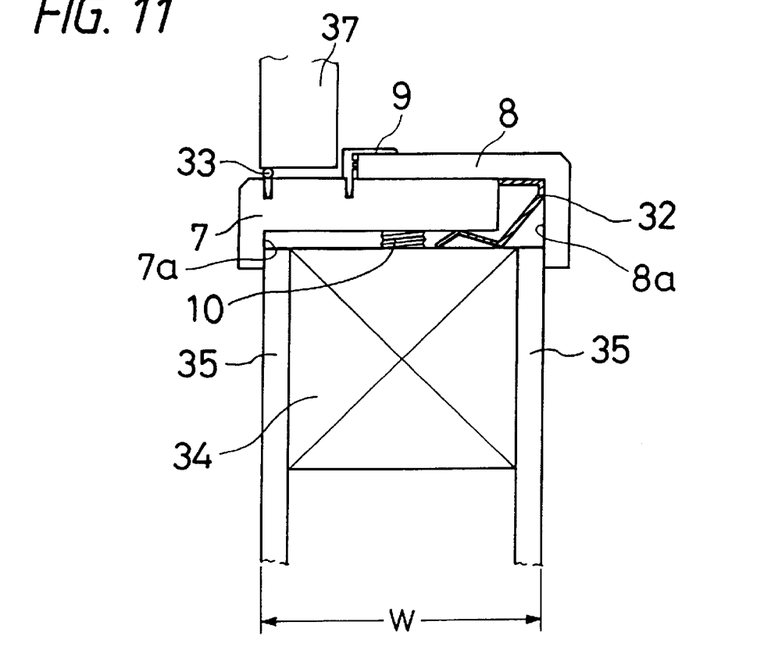
FIG. 11 is a cross-sectional view showing an example of the condition of the construction work for the frame materials according to the present invention.

FIGS. 10 and 11 illustrate an example of the width adjustable frame material of the present invention that is applied to a sliding door. As for such a sliding door, since a door 37 impacts on the surface of the frame material from a perpendicular direction when the door is closed, a door stopper packing 33 is attached to the surface of the frame material to thereby enable easy modification. In such an arrangement, the spacing would increase its closeness, and light is hardly leaked.

As with the material of these members, a single or a combination of a solid wood, plywood, fiber plate, laminated veneer lumber (LVL), glued laminated wood or other wooden materials, plastic, metal, etc. may be used for the frame materials. For the surface member and clip engaging member, a single or a combination of a plastic, metal, etc. may be used.

An example of installing the width adjustable frame material will not be explained using the frame materials of a sliding door.

As shown in FIG. 11, the plane on which the frame materials are disposed is so arranged that a wall material 35 such as a plasterboard is attached to the both surfaces of a pillar 34.

First, a frame member A (7) is attached to the pillar 34 using the frame adjustable fastener 10 as shown in FIGS. 1 to 3.

The attachment of the frame member A (7) and the positioning adjustment is finished with the frame adjustable fastener 10, and then the other frame member B (8) having a clip engaging members 32 is installed. At this time, the frame member B (8) is installed until a wall abutting plane 8a of the upstanding portion located at the back surface end portion of the frame member B (8) abuts against the wall material 35 surface, so that there may be no spacing between the wall abutting plane 8a and the wall member 35. After the installation of the frame members A and B are completed, the surface member 9 is attached. This results in adjusting the edge portion of the frame member B (8), to thereby eliminate a spacing produced between the wall abutting plane 8a and the wall member 35. Thereafter, a door stopper packing 33 is mounted to the frame member A (7), and the execution is completed.

According to the present invention, the type of the packing portion 31 of the surface member 9 and the door stopper packing 33 is different depending upon a hinged door (referred to a conventional door) and a sliding door. If the door stopper packing 33 is not used, a groove formed in the frame member A (7) for installing the door stopper packing 33 is filled with any appropriate engaging member and capped, so that the frame materials used for a sliding door are commonly used for a conventional door.

Accordingly, the width adjustable frame material of the present invention can realize the following advantages.

(1) Various types of frame materials are not necessary:

The width adjustable frame materials serving as an adjustable frame could be adapted for various levels of the wall thickness.

(2) Easy removing is possible:

The frame member A and the frame member B are released, and then the frame adjustable fastener that is provided thereunder is loosen, whereby the width adjustable frame materials can be removed without breakage on each of the members. For this reason, a door frame could be removed during a modification construction or the like without forming any defect on other members and the removed door frame may be reused.

(3) No door stopper projects:

According to the present invention, the surface side of the surface member and the surface of the frame member B are finished substantially coplanar. Therefore, when the surface member is used as a door stopper, the door stopper does not project as conventionally. The appearance is also simple.

(4) The number of the members for installation decreases at construction areas is a little:

Although a conventional adjustable frame requires four members, according to the present invention, no other members than three adjustable frame members are necessary, while these members serve as an adjustment function.

(5) Installation is facilitated:

With the frame adjustable fastener of the present invention, after lightweight fasteners are properly installed, then a heavier frame member A is attached thereto, and thereafter the other frame member B can be preliminary fixed thereto by means of the clip engaging member. Accordingly, with the use of the connecting fasteners, such a conventional difficulty was avoidable that such heavier frame members should be properly secured with being held.

(6) Even though accuracy for installation is low, execution is possible:

Unlike conventional frame material, namely adjustable frame material, the adjustable frame material of the present invention is not necessary for a proper installation at the center portion of the wall thickness W. Instead, the frame member A is secured, and thereafter the frame member B is installed so as to match with the frame member A.

(7) The width adjustable frame member can be used for both a sliding door and a hinged door:

If the surface member serving as a dual function of a door stopper and the door stopper packing used for a sliding door are modified, the width adjustable frame member is usable for both a sliding door and a hinged door.

(8) An effect of concealing the spacing is achieved:

Of course for a hinged door (a conventional door), also for a sliding door, an effect of concealing the spacing causing possible light leakage when the door closes may be achieved.

Although the aforementioned aspects of the present invention may separately be implemented, a combination of these aspects of the present invention can achieve a simultaneous adjustment of the frame positioning and the frame width.

Although there has been shown herein and described certain preferred embodiments of the present invention, manifestly it is capable of modification and rearrangement of parts without departing from the spirit and scope thereof.

What is claimed is:

1. An adjustable frame comprising a plurality of frame adjustable fasteners including:

a fixing member including an external thread member having a cylindrical manner for being incorporated at a partition side of an opening portion in a partition, and a base member for rotatably supporting said external thread member; and an internal thread member for being engaged with said external thread member and for being installed in a frame body, wherein said internal thread member is in a cylindrical manner and includes a falling-preventing portion in a ring form on the outer periphery surface for press-fitting into holes provided in the frame body, an internal thread on an inner periphery surface for being engaged with said external thread member, and a groove provided on the falling-preventing portion in a longitudinal direction where the internal thread member extends.

2. An adjustable frame as claimed in claim 1, wherein said external thread member is in a cylindrical manner and includes an external thread at the outer periphery and a through hole capable of introducing a screw thereinto, one end of said external thread member being rotatably supported by said base member, the other end of said external thread member being provided with a wrench receiving portion for turning a hexagonal socket portion, and said base member is for rotatably supporting said external thread member, said base member having a hole for fixing a screw to a building frame at the center thereof, said base member having projections for slide-stopping at the back surface thereof.

3. An adjustable frame as claimed in claim 1, wherein a hole for the frame adjustable fastener incorporated in the frame comprises a hole for installing said internal thread member and a through hole in communication with said hole for installing said internal thread member for turning said external thread member.

4. An adjustable fastener comprising:

a fixing member including an external thread member having a cylindrical manner for being incorporated at one member, and a base member for rotatably supporting said external thread member; and an internal thread member for being engaged with said external thread member and for being installed in the other member wherein said internal thread member is in a cylindrical manner and includes a falling-preventing portion in a ring form on the outer periphery surface for press-fitting into holes provided in the other member, an internal thread on the inner periphery surface for being engaged with said external thread member, and a groove provided on the falling-preventing portion in a longitudinal direction where the internal thread member extends.

5. An adjustable fastener as claimed in claim 4, wherein said external thread member is in a cylindrical manner and includes an external thread at the outer periphery and a through hole capable of introducing a screw thereinto, one end of said external thread member being rotatably supported by said base member, the other end of said external thread member being provided with a wrench receiving portion for turning a hexagonal socket portion, and said base member is for rotatably supporting said external thread, said base member having a hole for fixing a screw to one member at the center thereof, said base member having projections for slide-stopping at the back surface thereof.

* * * * *